US006688984B2

(12) United States Patent
Cole

(10) Patent No.: US 6,688,984 B2
(45) Date of Patent: Feb. 10, 2004

(54) BAR TOP GAMING UNIT

(76) Inventor: Joseph W. Cole, 7221 Sandy Plains Ave., Las Vegas, NV (US) 89131

( * ) Notice: Subject to any disclaimer, the term of this patent is extended or adjusted under 35 U.S.C. 154(b) by 0 days.

(21) Appl. No.: 09/875,773

(22) Filed: Jun. 5, 2001

(65) Prior Publication Data

US 2002/0183106 A1 Dec. 5, 2002

(51) Int. Cl.[7] .................................................. A63F 13/00
(52) U.S. Cl. ........................... 463/46; 463/29; 273/309; 273/138.1; 273/148 B
(58) Field of Search ......................... 463/12–13, 16–20, 463/46–47; 108/25–26; 312/242, 223.1, 325, 327, 328; 273/138.1, 118 R, 138.2, 148 R, 148 B, 309

(56) References Cited

U.S. PATENT DOCUMENTS 4,133,530 A * 1/1979 Takaichi et al. .............. 463/46
4,314,336 A 2/1982 Bernstein et al. ........... 364/411
D276,630 S 12/1984 Gimbel ........................ D21/37
4,689,742 A 8/1987 Troy et al. .................. 364/412
4,744,614 A * 5/1988 Gombosi ............... 206/315.11
D312,666 S 12/1990 Lempke et al. .............. D21/37
5,046,735 A 9/1991 Hamano et al. ........ 273/138 A
5,110,129 A 5/1992 Alvarez .................. 273/138 A
D333,164 S 2/1993 Kraft et al. .................. D21/13
5,324,036 A * 6/1994 Morrow .................. 273/148 R
5,655,966 A * 8/1997 Werdin et al. .............. 273/309
D383,171 S 9/1997 Hanscom ..................... D21/37
5,676,231 A * 10/1997 Legras et al. ............... 194/206
D388,835 S 1/1998 Yamaguchi .................. D21/11
5,813,914 A * 9/1998 McKay et al. .......... 273/143 R
5,857,910 A * 1/1999 Watanabe et al. ........ 273/138.2
5,882,258 A * 3/1999 Kelly et al. ................. 273/292
6,015,344 A * 1/2000 Kelly et al. ................... 463/16
D424,122 S 5/2000 Dickenson et al. .......... D21/13
D428,062 S 7/2000 Hayashi ..................... D21/325
6,201,532 B1 * 3/2001 Tode et al. ................. 248/917
D439,931 S 4/2001 Yamaguchi ................ D21/369
6,251,014 B1 * 6/2001 Stockdale et al. ............ 463/16
6,338,301 B1 * 1/2002 Almond ....................... 108/26
6,435,970 B1 * 8/2002 Baerlocher et al. ........... 463/46

OTHER PUBLICATIONS

IGT: S–Plus Slant Top, International Game Technology, Oct. 1995.*

IGT: Player's Choice Drop–In Bar and Slant–Top, International Game Technology, Oct. 1995.*

* cited by examiner

*Primary Examiner*—Michael O'Neill
*Assistant Examiner*—Christina M. Marks

(57) ABSTRACT

A bar-top gaming unit includes a housing having a top panel which is movable between open and closed positions. Components of the gaming unit are configured to minimize the size of the unit and maximize component access. A display is mounted to the movable top. A gaming controller is located inside the housing beneath the display, the controller providing or generating game play information for display by the display. Peripheral devices are located at either end of the housing on either side of the gaming controller and peripheral. The peripheral devices may comprise a receipt printer and a currency validator. In one embodiment, the gaming unit includes access points besides the top panel, as well as a number of security features including a locking or latching mechanism for individual elements such as the top panel and a cash box associated with a current validator.

12 Claims, 6 Drawing Sheets

BAR TOP GAMING UNIT

FIELD OF THE INVENTION

The present invention relates to devices for presenting games, and more particularly to a device configured to be positioned in a bar top and present one or more gambling and other events.

BACKGROUND OF THE INVENTION

A wide variety of devices exist which are configured to present one or more games. These devices include the well known slot machine and video poker machine, each of which is configured to present at least one gambling or wager-type event. By gambling event, it is meant a game which requires a player to place a bet, such as a monetary wager, for the opportunity of winning an award if the outcome of a presented game is a winning outcome.

Slot and video machines have a wide variety of configurations. Commonly, these machines comprise upright cabinets or housings which support game implementing hardware, such as controllers, a video display, lights, buttons, a coin hopper, bill validator and cash box, and/or a wide range of other devices. The housing is generally taller than it is wide, and occupies substantial vertical space. Generally, the housing is sufficiently tall that when the gaming machine is placed on a short support or stand, the gaming machine may be used by a player who is standing.

In some instances, this normal configuration of a gaming machine is undesirable. For example, it is desirable to provide games for play at a bar. Generally, a bar is configured to include an upwardly extending wall. A bar surface is supported at the top of the wall. The bar surface is a generally horizontal, planar surface for supporting served drinks and food. A customer sits on one side of the wall, and a server such as a bar tender is located at an opposing side of the wall. Generally, the bar surface extends or overhangs over the wall some distance in both directions. This permits a customer's legs to be positioned under the bar surface while the bar surface is located close to the remainder of their body. Food and drink service elements may be stored under the bar surface at the opposing server's side of the wall. Shelves may be provided under the bar surface for supporting glasswear. Often, one or more refrigerated units are located under the bar surface, these units used to house cooled beverages.

In this setting, a conventional gaming machine has numerous drawbacks. First, the height of the gaming machine is such that if it is placed on the bar surface, it is positioned too high to be used by a customer. If placed upon the floor, the gaming machine would be too low, and be located under the bar surface. The size of the gaming machine also prevents it from being integrated into the bar, as such would displace the space for customer's legs or food and drink service elements.

As a result of these drawbacks, bartop units have been developed. In general, existing bar top units comprise a housing supporting a horizontally-mounted display which faces upwardly. A mounting hole is formed in the bar surface. A trim member is placed about the periphery of the bar top unit. Screws are extended parallel to the bar surface through the trim member and into the material forming the bar surface. The bar top unit housing is lowered into the bar surface until it rests upon the trim member. The bar top unit housing is then attached to an inwardly extending lip of the trim member with fasteners.

The configuration of current bar top units has numerous drawbacks. A first drawback is the method of mounting the unit to the bar surface. As mentioned, this requires mounting a trim member to the opening in the bar surface. Then, the unit must be lowered into the opening defined by the trim member and then be connected to the trim member with a second set of fasteners.

Current bar top units also often still suffer from drawbacks relating to their application. First, the depth of these bar top units is still quite great, and does not permit the units to be placed in a location of the bar where a cooler is located under the bar surface.

Another problem is that the units are not arranged to be readily serviceable. First, some bar top gaming units are not configured for easy service by a technician in the event of a malfunction. Components of the unit may be layered upon one another within the housing, making it difficult for the technician to reach components positioned deep within the unit. To address this problem, in many instances the gaming unit is very deep and includes a large front panel which is removable. By providing a large front removable panel and spaced apart components, the technician can access all of the components. On the other hand, the depth of the unit is very large, preventing it from being used in many locations.

Also, the units are not configured for simple and secure service by a gaming operator, such as to empty a coin hopper or remove a full cash box. It is necessary to ensure that when the inside of the bar top unit is accessed by a technician, the coin hopper/cash box and the like remain secure. On the other hand, it is necessary that a gaming operator be able to readily remote coins or cash to service the machine without difficulty.

An improved bar top gaming unit is desired.

SUMMARY OF THE INVENTION

The present invention is a gaming unit adapted to present at least one game to a player. The game unit is adapted to be mounted in a support surface, such as a bar top. In one embodiment, the gaming unit is adapted to present a wager type game in which a player is required to place a monetary bet in order to participate in the game, and is provided an award if the result of the game is a winning outcome.

In one or more embodiments, the gaming unit is adapted to mounting in an opening formed in a support surface, such as a bar top. The gaming unit is supported by the support surface and extends below the support surface.

In one embodiment, the gaming unit includes a housing. The housing includes abase and at least one upwardly extending wall defining a generally enclosed interior area. In one embodiment, a first side and opposing second side extend upwardly from the base, a rear wall extends between the first and second sides and a front wall extends between the first and second sides. The first and second sides and front and rear walls define a generally rectangular periphery of the housing, the housing having a generally open top.

In one embodiment, the bar top gaming unit includes a top panel for selectively closing the otherwise open top of the housing. Preferably, the top panel is rotatably connected to the housing so as to be movable between a closed position in which it extends over the open top of the housing and an open position in which it is raised upwardly, providing access to the interior area of the housing via its open top.

In one embodiment, a flange extends outwardly from at least a portion of the housing. The flange extends outwardly a greater distance than the housing in the area of the flange, whereby the housing may be extended through an opening in a support surface and whereby the flange engages the support surface to support the unit.

At least one display is mounted to the top panel. In one embodiment, the display is an LCD or other flat panel display which is mounted to an inner surface of the top panel in alignment with an opening in the top panel through which the display is visible.

A gaming controller is located in the interior area of the housing. The gaming controller is adapted to generate game information, including information for display by the at least one display.

The gaming unit preferably includes one or more peripherals for implementing a game. In one embodiment, the peripherals include one or more of a receipt printer, a card or other media reader, a coin acceptor and a currency validator and storage container. In one embodiment, a first gaming unit peripheral device is positioned near one end of the housing and a second gaming unit peripheral device is positioned near the opposite end of the housing. The gaming controller is located between the first and second peripheral devices and generally beneath the display.

In a preferred embodiment, the first peripheral device comprises a receipt printer. The second peripheral device comprises a currency validator and associated currency storage device or "cash box."

In one or more embodiments, access is provided to the interior area of the housing including one or more of the components therein, while at the same time maintaining the security of the unit. In one embodiment a front wall of the housing has an opening therein which is selectively closeable with a front panel. A lock member is associated with the front panel for locking it in a closed position.

A latch mechanism maintains the top panel in its closed position. The latch may be disengaged with a release mechanism located in the interior area of the housing accessible by opening the front panel.

In one embodiment, the top panel includes an opening generally to one side of the display. A lockable door is provided for selectively opening and closing the opening and gaming access to components in the housing, such as a bill validator and cash box.

In a preferred embodiment, a separate locking mechanism is provided for locking the cash box and preventing its removal even if the front panel, top panel, and/or access door are open and the cash box is exposed. In one embodiment, the locking mechanism includes a rotating arm or cam for selectively engaging a latch member associated with the cash box. When engaged with the latch, a pin member of the cash box is engaged, preventing the cash box from being raised from the housing. When the arm or cam is raised, the pin is permitted to clear the latch, allowing the cash box to be removed. The arm or cam includes a secondary flange for engaging a top portion of the cash box and preventing its removal even if the latch is not engaged.

In one embodiment, the top panel includes at least one sloping surface. Preferably, the display is associated with the sloping surface so as to be angled towards a player.

A variety of game and related features are provided. In one embodiment, game software or game data may be transmitted to and from the gaming unit via a wired or wireless network. Video information may be display to a player other than game information. Such information may include television or cable programming, a movie or the like. In one embodiment, the display includes picture in picture capability or more than one display is provided permitting the player to view multiple video events.

The gaming controller maybe adapted to present a wide variety of games, including more than one game. The gaming unit peripherals are in communication with the gaming controller, such as for sending a signal regarding the receipt of currency.

The gaming unit of the invention has a number of advantages. Among other things, the configuration of the unit, including the housing and the individual components minimizes the size of the gaming unit. The small size of the unit allows the unit to be located in existing and new environments where little support surface area is available. The unit also has a small depth, allowing the unit to be placed where the area beneath the support surface is minimal, such as in a bar surface located above a cooler or refrigerator.

Further objects, features, and advantages of the present invention over the prior art will become apparent from the detailed description of the drawings which follows, when considered with the attached figures.

DETAILED DESCRIPTION OF THE INVENTION

Figure 1:
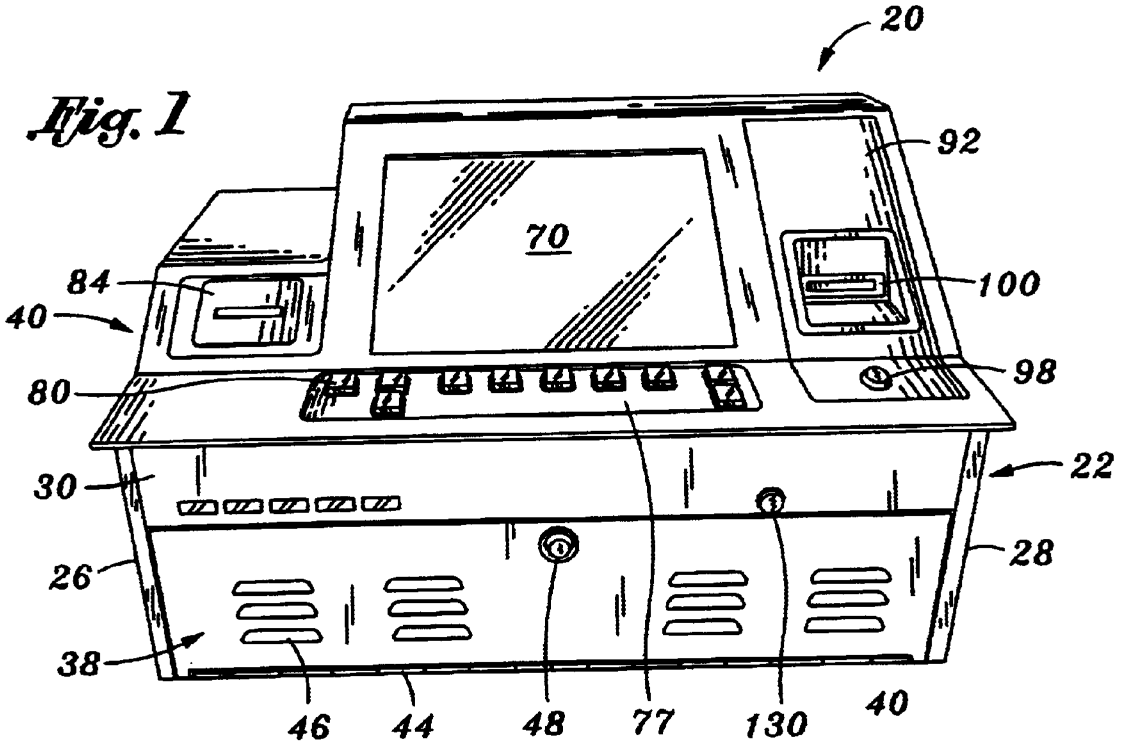
FIG. 1 is a front perspective view of a bar top gaming unit in accordance with an embodiment of the invention.

The invention is a bar top gaming unit. In the following description, numerous specific details are set forth in order to provide a more thorough description of the present invention. It will be apparent, however, to one skilled in the art, that the present invention may be practiced without these specific details. In other instances, well-known features have not been described in detail so as not to obscure the invention.

One embodiment of a bar top gaming unit 20 will be described with reference to FIGS. 1–4. Referring first to FIGS. 2 and 4, the bar top gaming unit 20 includes a housing 22. In one embodiment, the housing 22 is defined by a bottom or base 24 and at least one wall extending upwardly from the base. In a preferred embodiment, first and second sides 26,28 extend upwardly from opposing edges of the base 24. The housing 22 also includes front and rear walls 30,32 which extend upwardly from the base 24. The front and rear walls 30,32 extend between the first and second sides 26,28, the walls and sides defining a perimeter of the housing 22.

In one embodiment, the housing 22 is generally rectangular in shape. In this embodiment, the front and rear walls 30,32 are longer than the first and second sides 26,28.

The base 24, first and second sides 26,28 and front and rear walls 30,32 define a generally closed interior area 34. The first and second sides 26,28 and front and rear walls 30,32 have a top edge forming the perimeter of a generally open top of the housing 22.

In one embodiment, the front wall 30 has an opening 36 therein providing access to the interior 34 of the housing 22. A front panel 38 is movably connected to the housing 22 for selectively opening and closing the opening 36 in the front wall 30.

In a preferred embodiment, a top panel 40 is connected to the housing 22 and movable between a position in which it generally encloses the otherwise generally open top of the housing 22 and a position in which the top of the housing 22 remains generally open.

In one embodiment, the base 24, first and second sides 26,28, and front and rear walls 30,32 are constructed of metal. In one embodiment, metal plates or panels are connected, such as by welding. These members may also be formed as a unitary construction.

In one embodiment, the front panel 38 also comprises a metal panel. As noted above, the front panel 38 is preferably movable between a first position in which it generally closes the opening 36 in the front wall 30 of the housing 22, and a second position in which the opening 36 is accessible. The front panel 38 includes a lower edge. In one embodiment, the front panel 38 is movably connected to the housing 22 with a hinge 44. The hinge 44 connects the lower edge 42 of the front panel 38 to the housing 22, and more particularly the base 24. The front panel 38 may be connected to the housing 22 in other manners, including by more than one hinge.

Figure 2:
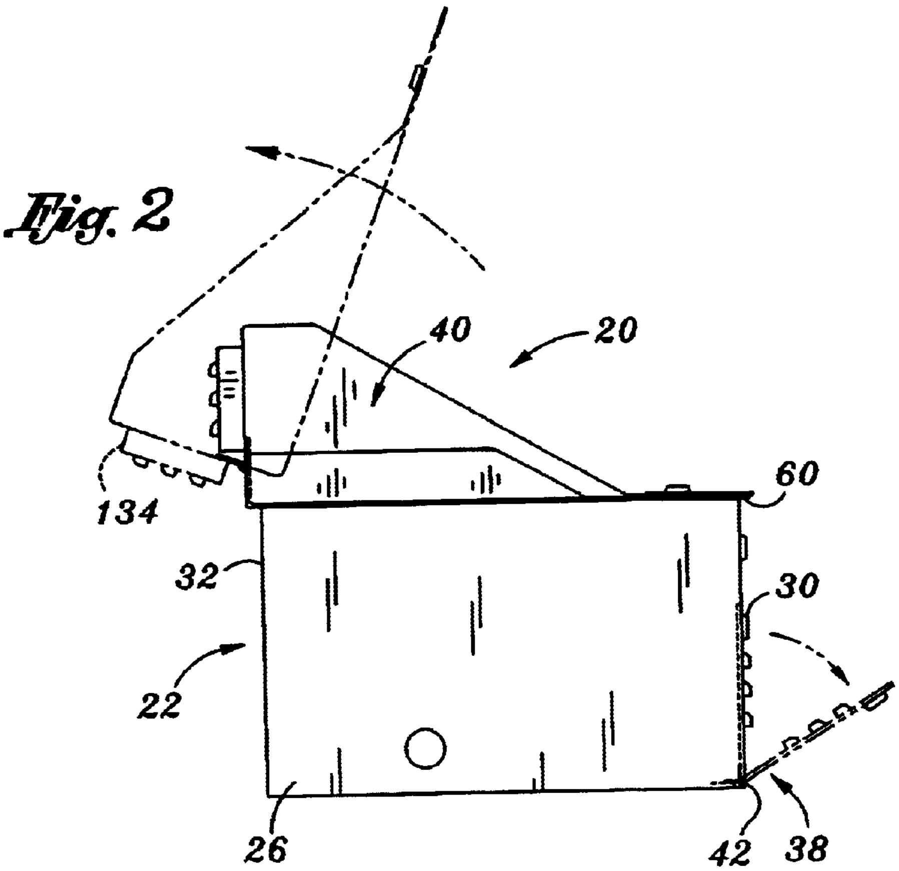
FIG. 2 is a side view of the bar top gaming unit illustrated in FIG. 1 illustrating movement of a top panel and front panel thereof.

Referring to FIGS. 1 and 4, the front panel 38 includes a plurality of ports or vents 46. In one embodiment, the ports 46 are formed by punching portions of the front panel 38 and expanding them outwardly with respect to the remainder of the panel 3 8. In a preferred embodiment, the ports 46 define openings which face downwardly in the direction of the lower edge 42 -of the panel 38. As illustrated, there are four rows of three vertically spaced ports 46. There may be a greater or lesser number of ports.

Figure 3:
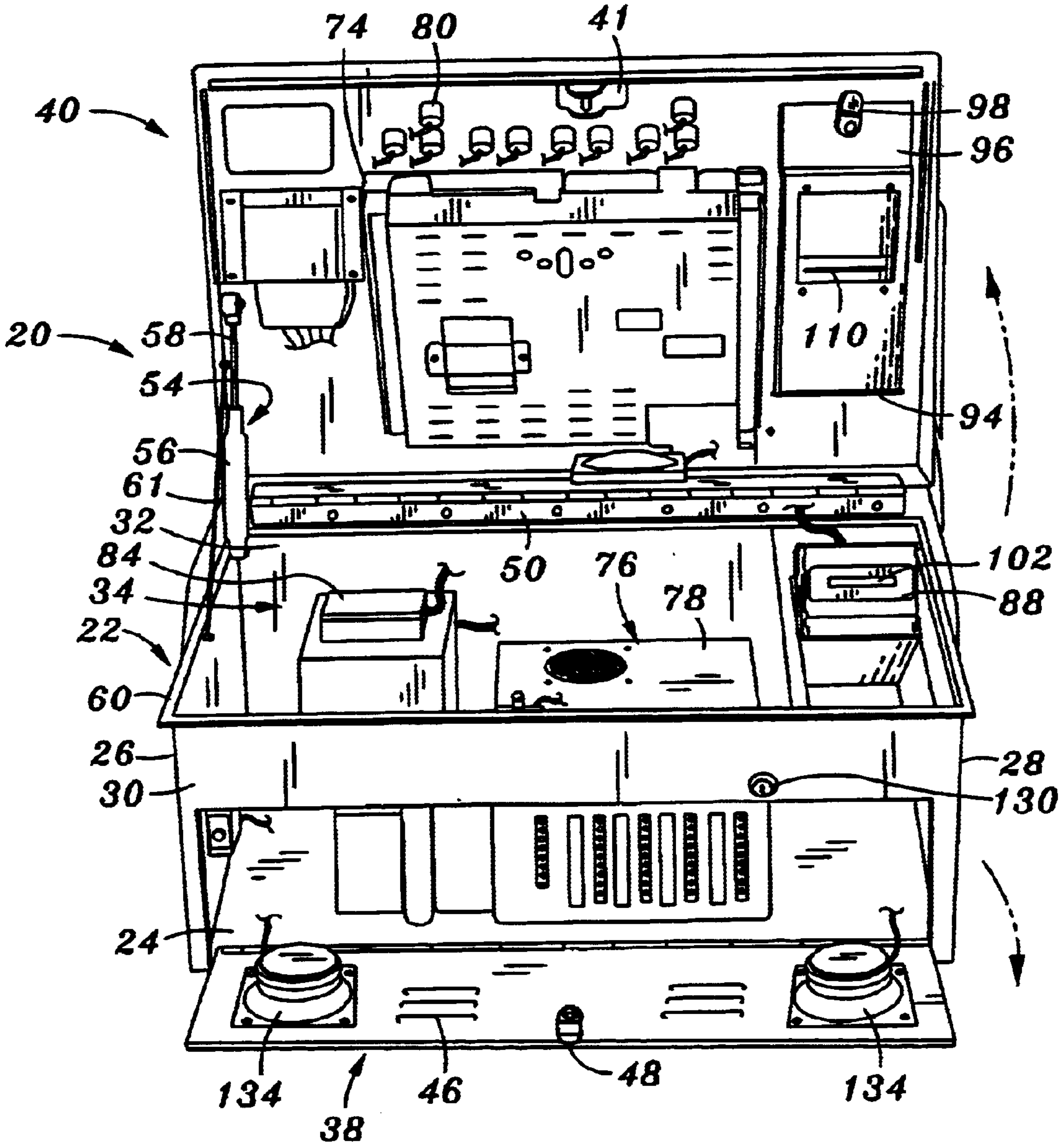
FIG. 3 is a front perspective view of the bar top gaming unit illustrated in FIG. 1 with the top panel and front panel thereof in an open position.
Figure 4:
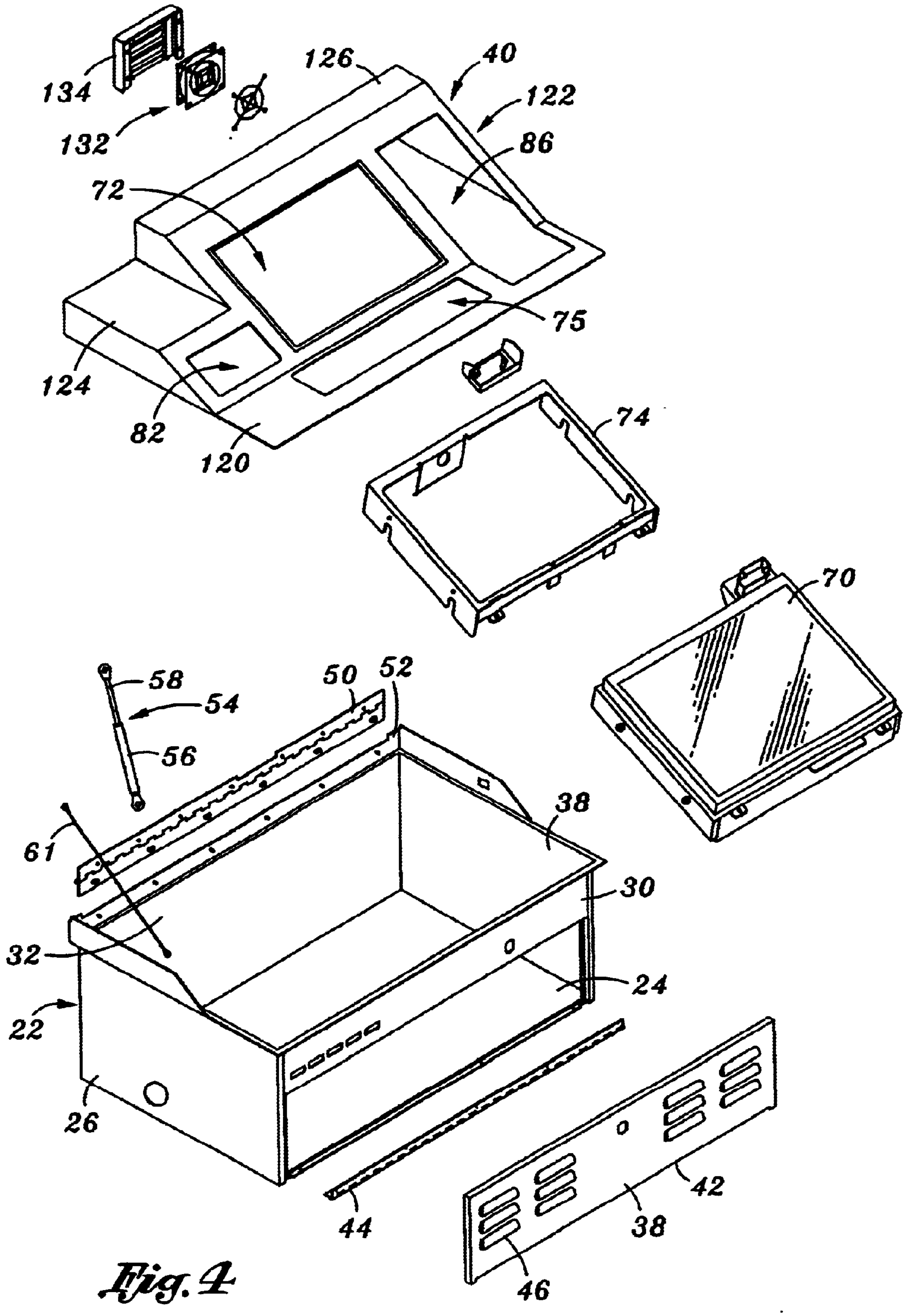
FIG. 4 is a partial exploded view of the bar top gaming unit illustrated in FIG. 1.

Referring to FIGS. 1 and 3, in a preferred embodiment, a locking mechanism 48 is provided for retaining the front panel 38 in a closed position (i.e. where it closes the opening 36 in the front wall 30). In one embodiment, the locking mechanism 48 comprises a simple rotating latch. The latch of the locking mechanism is positioned at a rear of the panel, and a key accepting actuator extends from a front side of the panel through the panel to the latch for rotating the latch. In use, turning of a key causes the latch to rotate into a first position in which it extends behind a portion of the front wall 30 opposing the front panel 38, preventing the front panel from being rotated into an open position. Rotation of the latch into a second position out of engagement with the front wall 30 permits the front panel 38 to be opened.

Referring to FIG. 4, the top panel 40 is also preferably constructed of metal. As indicated above, the top panel 40 is preferably movably connected to the housing 22. In one embodiment, a hinge 50 connects a back edge of the top panel 40 to a flange 52 at the top of the rear wall 32. The flange 52 is a generally planar mounting surface which extends generally horizontally (i.e. generally perpendicular to the remainder of the rear wall 32). As illustrated in FIG. 2, the hinge 50 permits the top panel 40 to be rotated into a closed position in which it extends over the otherwise open top of the housing 22. The hinge 50 also permits the top panel 40 to be rotated upwardly into a position in which it does not generally obscure the open top of the housing 22, permitting access to the interior area 34. Other means maybe provided for movably connecting the top panel 40 to the housing 22, such as more than one hinge.

Referring to FIGS. 3 and 4, in one embodiment, a strut 54 is provided which assists in moving the top panel 40 to its open position, and which holds the panel 40 in the open position. Preferably, the strut 54 is a gas or liquid type strut having a body 56 and a rod 58. The body 56 is connected to the housing 22 and the rod 58 is connected to the top panel 40. In one embodiment, the body 56 and rod 58 are connected near the midpoint along the length of the first side 26 of the housing 22 and a side portion of the top panel 40. When the top panel 40 is opened, the rod 58 is extended relative to the body 56. So extended, movement of the rod 58 back into the body 56 is resisted, keeping the top panel 40 raised into its open position. Upon application of sufficient pressure, the rod 58 is compressed back into the body 56, permitting the top panel 40 to be moved into its closed position. One of ordinary skill will appreciate that the characteristics of the strut 54 should be selected with the weight of the top panel 40 (and associated accessories) and the necessary closing force in mind.

In one embodiment, a safety mechanism 61 is provided for preventing over-rotation of the top panel 40 with respect to the housing 22. As illustrated, the safety mechanism 61 may comprise a wire which is connected to both the housing 22 and the top panel 40. Preferably, the length of the wire is selected to prevent rotation of the top panel to only slightly beyond vertical.

As illustrated partially in FIG. 3, a locking mechanism is provided for maintaining the top panel 40 in a closed position. In a preferred embodiment, the locking mechanism includes a latch 41 which is mounted to the underside of the top panel 40 near the front thereof. The latch 41 preferably comprise a mounting base and a pin spaced outwardly therefrom. The pin is adapted to be engaged by a lever (not shown) which is mounted to the inside of the front panel 30. The lever is movable between a first position in which it engages the pin of the latch 41 and a second position in which is does not.

Preferably, the latch 41 may be released only from the interior of the housing 22. In one embodiment, the latch 41 is positioned so that it may be released once access to the inside of the housing 22 is gained through the front panel 38.

In one embodiment, the lever is biased, such as with a spring, into a position in which it engages the pin of the latch 41. To release the latch 41, a user applies force to rotate it out of engagement with the pin. When the top panel 40 is closed, the pin moves past the lever and is biased into engagement with the pin, locking the top panel 40.

Preferably, the housing 22 is specifically sized configured for bar top usage. In one embodiment, the total length of the housing 22 from first side to second side 24,26, is about 24–28, and most preferably about 26 inches. The width of the housing from front wall 30 to rear panel 32 is about 14–18, and most preferably about 16 inches. The height of the housing 22 excluding the top panel 40 (i.e. the height from the base 24 to the top edge of the sides/walls) is about 8–12, and most preferably no more than about 10 inches.

In a preferred embodiment, the housing 22 is adapted to fit within an opening formed in a bar top or support surface.

Preferably, the housing 22 includes a mounting flange 60 for this purpose. In one embodiment, the flange 60 includes the flange 52 used to mount the hinge 50, as well as a mounting surface defined by top portions of the first and second sides 24,26 and front wall 30 of the housing. Preferably, all portions of the mounting flange 60 are generally flat and horizontally extending. The mounting flange 60 extends outwardly from the sides and walls of the housing 22, defining the outer-most periphery or dimension of the housing 22 in a support surface. Installation of the housing 22 is described in more detail below.

The bar top gaming unit 20 also includes a plurality of devices for presenting one or more games to a player. In one or more embodiments, the housing 22 is specifically configured to accommodate these devices.

In a preferred embodiment, the bar top gaming unit 20 is configured to present one or more gambling or wager type games. By a gambling or wager type game, it is meant a game which requires that the player place a bet or wager in order to play the game. In a preferred embodiment, a player is provided an award in the event the outcome of the game is a winning outcome. A variety of games may be implemented, including games of skill and/or chance.

Referring to FIGS. 1 and 4, in one embodiment, the bar top gaming unit 20 includes a display 70. The display 70 may be of a variety of types. In a preferred embodiment, the display 70 is an LCD display. The display 70 may comprise other types of video displays, such as plasma or CRT. The display may also comprise a mechanical display, as in the case of a set of rotating reels.

In a preferred embodiment, the display 70 is mounted to the top panel 40 of the housing 22. In this configuration, the top panel 40 includes a display opening 72 through which the display 70 is visible. As detailed below, in a preferred embodiment, the display opening 72 is generally centrally located in the top panel 40.

In a preferred embodiment, the display 70 is mounted to the top panel 40. As illustrated in FIG. 4, in one embodiment, the display 70 is mounted to an inner or side surface of the top panel 40 in alignment with the display opening 72is mounted with a mounting bracket 74. The mounting bracket 74 comprises a frame member which is attachable to a bottom side of the top panel 40 and which supports the display 70 in alignment with the opening 72.

As illustrated in FIG. 3, in one embodiment, a gaming controller 76 is provided for implementing the game including generating game information such as game play and outcome information and communicating with one or more other devices such as peripheral devices of the unit 20. The gaming controller 76 maybe adapted to perform one or more of a wide variety of other functions.

The gaming controller 76 may have a variety of configurations, as known to those of ordinary skill in the art. In one embodiment, the gaming controller 76 includes a processor for executing program code, a memory for storing information, and a bus connecting the processor and memory and permitting communication with a wide variety of other devices. The other devices may include a mass storage device, such as a hard drive, a video controller associated with the display 70, and other peripheral devices. The processor may be of a variety of types, including those which are commercially available from companies such as Sun Microsystems, AMD and Intel. The memory may also be of a variety of types, such as RAM, EEPROM and the like.

In one embodiment, the gaming controller 76 is housed within a casing 78. In this manner, the individual components of the gaming controller, such as a mother board including the processor, are protected. In addition, this permits the gaming controller 76 to be easily removed.

In a preferred embodiment, the gaming controller 76 is located generally centrally within the housing 22 between the first and second sides 26,28. When the display 70 is located in the top panel 40, as described above, the gaming controller 76 is located under the display 70 when the top panel 40 is in its closed position.

In one embodiment of the invention, at least one player input device is provided for allowing the player to interact with the gaming controller 76. In one embodiment, the display 70 may be of a touch-sensitive type. In one embodiment, the top panel 40 includes a button panel opening 75 for supporting a button panel 77. In one embodiment, the button panel 77 is generally rectangular in shape, and the button panel opening 75 is similarly configured. The button panel 77 may be constructed from a metal plate and attached to the top panel 40 with screws or other fasteners.

In one embodiment, as illustrated in FIG. 1, one or more buttons 80 are connected to the button panel 77. The buttons 80 may be of a variety of types and sizes, such as square, rectangular or circular push-buttons. The buttons 80 may be illuminated. Preferably, the buttons 80 have an output which is connected to the gaming controller 76, such as the bus, whereby an input to a button yields an input signal to the controller 76. The buttons 80 may be used to provide input regarding a variety of actions, such as "bet credit," "cash out," "hold" or a variety of selections associated with the play of a game.

In other embodiments, other input devices may be provided. For example, a keyboard or keypad may be provided instead of or in addition to the button(s).

In a preferred embodiment, the bar top gaming unit 20 includes one or more peripheral devices. These gaming unit peripheral devices may include one or more of a printing device, a card or other media reader (such as a player tracking magnetic card or smart card or a credit card), a currency acceptor and validator, a currency storage device, a coin acceptor, a coin hopper, or other displays and other devices known in the art.

In the preferred configuration of the bar top gaming unit 20, the housing 22 is arranged to accept at least two of these peripheral devices, the devices located at either side of the unit 20. As illustrated in FIG. 4, the top panel 40 of the housing 22 includes a reader/receipt opening 82. This opening 82 is located near the end or side of the top panel corresponding to the first side 26 of the housing 22 and thus to one side of the portion of the top panel 40 supporting the display 70.

A media reader or printing device 84 is arranged to be accessed through the opening 82. In one embodiment, the media reader or printing device 84 is positioned in the interior area 34 of the housing 22 near the first side 26. In the case of a media reader, the media reader preferably includes a media accepting slot which, when the media reader is correctly positioned, is accessible through the opening 82 in the top panel 40 when the top panel 40 is in its closed position. Likewise, in the case of a printing device, the printing device includes a dispensing slot which is accessible through the opening 82 in the top panel 40.

In the event a media reader is used, it may be of a variety of types. For example, the media reader may be of the type arranged to read information associated with a magnetic stripe on a media. The card reader may also be arranged to read smart cards, including cards having associated microchips. The media reader may also be an optical scanner, reading bar codes or other printed or displayed information.

Likewise, in the event a printing device is used, it may be of a variety of types. For example, the receipt printer may be a thermal type printer. The printing device may be arranged to print, stamp or otherwise associate information with a media. The media may comprise a paper receipt or other elements, such as paper or plastic cards.

Regardless of the type of peripheral device installed, the device is preferably placed in communication with the gaming controller 76, such as by way of a communication interface associated with the bus of the controller 76. In this manner, the gaming controller 76 may receive input from the device, such as information read from a card or control signals, and may send output to the device for controlling it. For example, the gaming controller 76 may cause the receipt printer to print a receipt containing specific information.

In one embodiment, another peripheral device may be located on the other side of the display 70. As illustrated in FIG. 4, the top panel 40 includes a bill validator opening 86. This opening 86 is positioned on an opposite side of the display opening 72 from the printing device/media reader opening 82. As illustrated, the opening 86 is generally rectangular. The shape of the opening 86 is primarily dictated by the shape of the currency accepting/validating mechanism and associated storage container.

Preferably, as best illustrated in FIG. 1, a door 92 is associated with the top panel 40 for selectively opening and closing the opening 86. In one embodiment, the door 92 includes a rear edge 96. The door 92 is connected to the top panel 40 with a hinge 94 (see FIG. 3) which is connected to both the rear edge 96 of the door and an edge of the top panel forming the opening.

In a preferred embodiment, a locking mechanism 98 is provided for locking the door 92 in a closed position. In one embodiment, the locking mechanism 98 comprises a latch member which is rotatable with a key, in a similar manner to the lock 48 associated with the front panel 38.

A slot 100 is located in the door 92. The slot 100 is preferably elongate and narrow, and sized to accept currency there through.

Figure 5A:
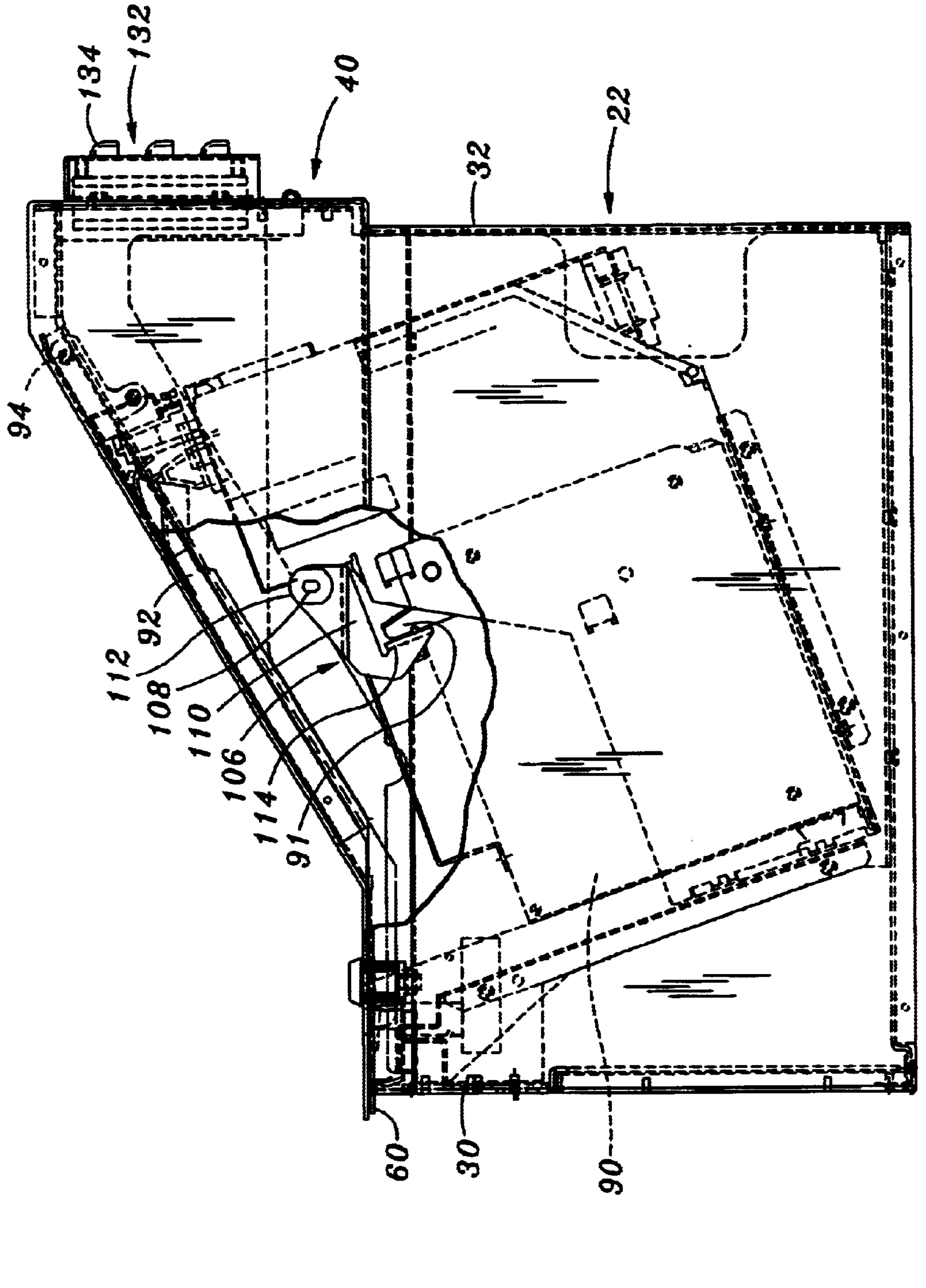
FIG. 5A is a side view of the bar top gaming unit illustrated in FIG. 1 showing internal components in phantom, including a cash box locking mechanism including a cam member engaging the box.
Figure 5B:
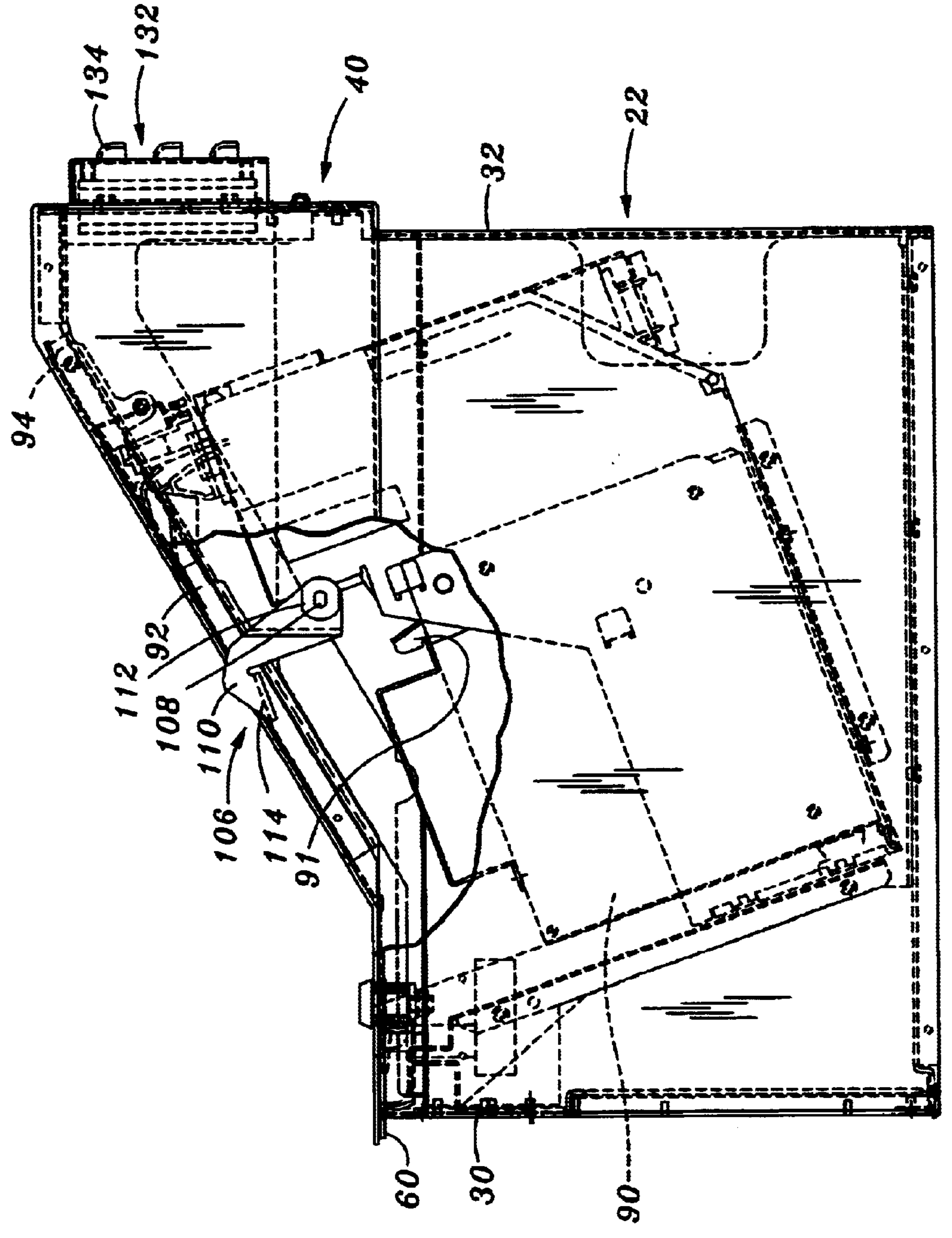
FIG. 5B is a view corresponding to that of FIG. 5A except with the cam member of the cash box locking mechanism raised into an unlocked position.

Referring to FIGS. 3 and 5, a currency accepting/validating mechanism 88 is located in the interior space 34 of the housing 22, preferably adjacent the second side 28. The mechanism 88 may be of a variety of types, but is preferably arranged to confirm the authenticity of currency placed therein. In one embodiment, the bill validator mechanism 88 includes a currency accepting slot 102. When the currency accepting mechanism 88 is located in the housing 22, the slot 102 thereof is preferably aligned with the slot 100 in the door 92. In this manner, a player may pass currency through the door 92 directly into the validator mechanism 88.

The currency acceptor/validator mechanism 88 is preferably in communication with the gaming controller 76. This allows, for example, the mechanism 88 to indicate to the gaming controller 76 the value of currency accepted from a player which the player may use to place a wager.

In a preferred embodiment, a storage container in the form of a cash box 90 is associated with the currency acceptor/validator mechanism 88 for storing accepted currency. Such cash boxes 90 and their operation are well known.

Referring to FIGS. 5A, 5B, 6 and 7, in one embodiment, a locking mechanism 106 is provided for retaining the cash box in the housing 22. In a preferred embodiment, the currency acceptor/validator mechanism 88 and cash box 90 comprise a JCM American Corporation (Las Vegas, Nev., USA) Model WBA validator and cash box mechanism. This model validator and cash box mechanism includes a pin extending from an exterior of the cash box 90 for selective engagement with a latch 91. In one position, the latch 91 engages the pin to prevent movement of the cash box from a supporting structure. In another position, the latch 91 allows the pin to be moved past the latch 91, allowing the cash box 90 to be raised upwardly and removed from its support.

In accordance with the invention, the locking mechanism 106 cooperates with the latch 91 of the cash box 90 to selectively lock the cashbox to the housing 22, preventing removal of the box from the housing. In a preferred embodiment, the locking mechanism 106 selectively locks the latch 91 into its pin-locking position, or releases the latch and thus the pin, allowing the cash box to be removed.

In one embodiment, the locking mechanism 106 includes a lock body 108 which extends through the second side 28 of the housing 22. A first end of the lock body 108 located at the exterior of the housing 22 is adapted to accept a key. The second end of the lock body 108 has a cam member 110 mounted thereon. A locking nut 112 engaging the second end of the lock body 108 at an interior of the second side 28 prevents removal of the lock body 108 from the housing 22 from the exterior of the housing. Another locking nut 111 secures the cam member 110 to the lock body 108.

The cam or arm member 110 includes an engaging tab 114. The engaging tab 114 comprises a generally planar surface which is adapted to engage a tip of the latch 91 of the cash box 90. When looking at the cam member 110 in the direction of the inside of the housing 22 towards the second side 28, the cam member 110 may be rotated with a key from a raised, unlocked position in a clock-wise direction to a lowered, locked position. In the locked position, the tab 114 presses against the latch 91, maintaining the latch 91 in its pin-locking position. In the unlocked position, the latch 91 is moveable to its unlocked position, allowing the pin on the cash box 90 to pass by the latch when the cash box is removed. In the configuration described, removal of the cash box 90 is prevented even if the pin slips past the latch 91.

Figure 6:
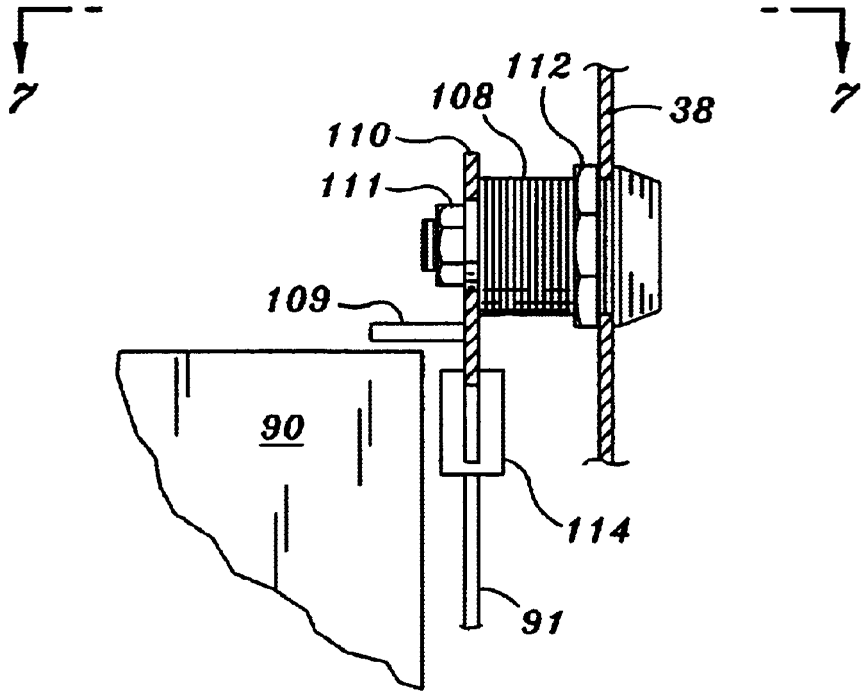
FIG. 6 is a front plan view of the cash box locking mechanism of the invention.
Figure 7:
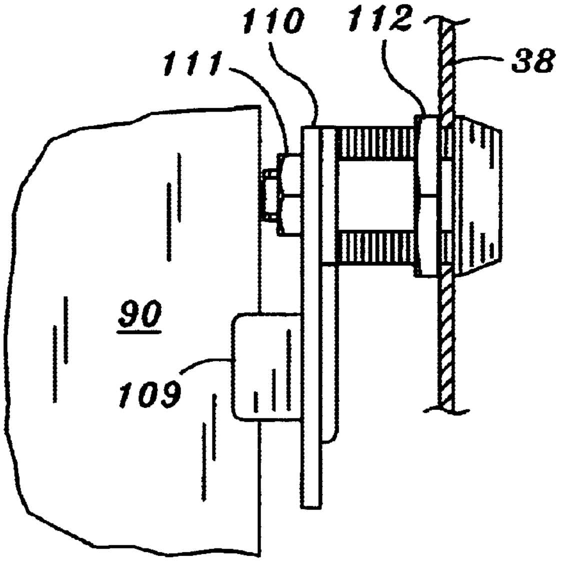
FIG. 7 is a top plan view of the cash box locking mechanism illustrated in FIG. 6.

In a preferred embodiment, a flange 109 extends outwardly from the arm of the cam member 114. When the cam member 114 is lowered into its locking position, the flange 109 is positioned above the housing of the cash box 90, as best illustrated in FIGS. 6 and 7.

In this embodiment, it is preferred that the cash box 90 be oriented so that the side thereof which includes the latch 91 is positioned adjacent the side (in this case, the second side 28) of the housing 22. In this position, the latch 91 is closely spaced to the side 28 where the lock 106 is conveniently mounted. The lock 106 can then be securely supported and be compact in design, and yet achieve the desired cash box 90 locking function.

As illustrated in FIGS. 1,2 and 4, in a preferred embodiment of the invention, the display 70 is mounted at an angle with respect to horizontal. As illustrated, the display 70 is tilted upwardly from horizontal to face a player of the bar top gaming unit 20.

In one embodiment, the top panel 40 includes a generally horizontal section 120 to which the button panel 77 is mounted. The top panel 40 includes a sloping section 122 which includes the card reader/receipt opening 82, the display opening 72, and the majority of the bill validator door opening 86. Preferably, the sloping section 122 extends at an angle of about 30 degrees with respect to horizontal. Thus, the display 70 which is mounted to an underside of the sloping section 122 of the top panel 40 is also mounted at this same angle.

In one embodiment, a portion of the sloping section 122 near the first side 26 terminates in a generally flat section 124. The remainder of the sloping section 122 extends upwardly to a shorter flat section 126.

Referring to FIGS. 1 and 3, in one embodiment, an external gaming controller reset 130 is provided. The gaming controller reset 130 is preferably key operated. The reset 130 includes a rotating switch member which is mounted in the front panel 30 of the housing 22. The switch member includes a keyway for accepting a key. When a key is used to rotate the switch member, a signal is generated which causes the gaming controller 76 to be reset. Of course, a variety of other reset mechanisms may be provided other than that described and illustrated. It is desirable, however, to provide a secure reset mechanism which is accessible from the exterior of the bar top gaming unit 20. This enables, for example, an operator to reset the unit 20 without having a service technician travel to the location.

Referring to FIG. 4, in one embodiment, at least one fan 132 is provided for use in cooling the components internal to the housing 22. In a preferred embodiment, an aperture is formed in a rear portion of the top panel 40. The fan 132 is mounted to the top panel 40. The fan 132 comprises a bladed device mounted to a shaft driven by a motor. A cover 134 is mounted over the fan 132 to prevent contact with the moving blades of the fan. The fan 132 is preferably electrically driven. In one embodiment, the fan 132 is arranged to draw warm air from within the interior area 34 of the housing 22 and expel it from the housing 22. Cool air is then drawn inwardly through the ports 46 in the front panel. In this arrangement, a flow of cool air is induced over and around the gaming controller 76 and other electrical components within the housing 22, cooling them.

In one embodiment, as illustrated in FIG. 3, a pair of speakers 134 are provided for generating audible information. Preferably, the speakers 134 are associated with the gaming controller 76, such as via the bus of the controller 76. In this manner, audio information is transmitted to the speakers 134, and the speakers in turn generate the audio information. In one embodiment, the speakers 134 are of the well-known electromechanical diaphragm type.

In one embodiment, the speakers 134 are mounted to the inside surface of the front panel 38. When the front panel 38 is closed, the speakers 134 are contained within the housing 22. The speakers 134 are mounted to the front panel 38 so as to face outwardly of the housing 22, and are positioned adjacent or over the ports 46. In this manner, the sound generated by the speakers 134 is readily transmitted to through the front panel 38 of the housing 22 to the player.

Assembly and use of the bar top gaming unit 20 of the invention will now be described in detail. First, the bar top gaming unit 20 may be configured to present a variety of games and may be configured in a variety of manners. The gaming controller 76 may be configured to present a variety of different games, including more than one game. In one embodiment, this is accomplished by directing appropriate software code to the memory or mass storage device of the gaming controller 76. The functionality achieved with the software may also be achieved by appropriate hardware, such as a circuit or microchip.

The bar top gaming unit 20 maybe configured to include a variety of different peripheral devices for use in presenting a game. The type of peripheral devices chosen may be dependent upon the particular use of the unit 20, including its location.

In general, the unit 20 will normally be configured to include at least one peripheral device adapted to accept a wager. This device may comprise a currency acceptor/validator mechanism 88 as described above. Alternatively, a coin acceptor or credit card reader may be provided.

Preferably, the unit 20 includes at least one other device, such as an award issuing device. Such a device may be a receipt printer or coin hopper with dispenser.

Once assembled, the bar top gaming unit 20 is preferably mounted to a bar top or similar surface. An opening is formed in the bar top. The opening is larger than the dimensions of the housing 22 except for the flange 60. The housing 22 is lowered through the opening in the bar top until the flange 60 rests upon the bar top or other support surface. At this time, the bar top gaming unit 20 is securely supported. Screws or other fasteners may optionally be used to further secure the unit 20, such as to prevent the theft of the unit 20 by its removal.

Appropriate connections are made to the bar top gaming unit 20, such as for powering the gaming controller 76 and other electrically powered peripherals, including the display 70.

In the event access is needed to the interior area 34 of the housing 22, appropriate personnel may release the top panel 40. As described above, in one embodiment, the front panel 38 is opened. The lever is then disengaged from the pin of the latch 41 which secures the top panel 40 in its closed position. The top panel 40 may then be raised into its open position. Once raised, the top panel 40 remains in its open position with the aid of the strut 54. Access is provided to the interior area 34 of the housing 22 via the opening at its top.

Access may also be gained to the interior area 34 via the front panel 38 without opening the top panel 40. The lock 48 may be unlocked and the front panel 38 rotated downwardly, permitting access to the interior area 34 via the opening 36.

Independent access may be gained to the currency acceptor/validator mechanism 88 and/or cashbox 90. The lock 98 maybe unlocked and the bill validator door 92 raised upwardly, permitting access to the bill validator 88 and cash box 90 via the opening 86 in the top panel 40.

The cash box 90 maybe removed by disengaging the cam member 110. Once rotated into its upward position, the latch associated with the cash box 90 may be moved, permitting the pin to be moved past it, and allowing the cash box to be removed.

The bar top gaming unit of the invention may have a variety of other configurations than that explicitly described above. In one embodiment, the display 70 may be arranged to display "picture-on-picture" (i.e. more than one independent video source/feed). In another embodiment of the invention, the bar top gaming unit may include more than one display. For example, the bar top gaming unit may include two smaller displays which occupy approximately the same space as the single display 70. Such arrangements permit the display of information regarding two or more games at the same time, or one game and other information. In one embodiment, picture on picture is less desired, as the security of the presented data is less verifiable (since two data streams are mixed or combined) and subject to objection by gaming authorities.

In one embodiment, the content of the information which is displayed may include other than game play information.

In one embodiment, a plurality of video sources may be provided, such as television or cable programming, sports programming, movies and other content. A tuner, on-screen menu or other means may be provided allowing the player to select the particular video content which the player wishes to view. In one embodiment, a communication link may be provided with the Internet, allowing a player to obtain content from the Internet and engage in Internet-related activities which are now known or later developed. For example, a player may utilize the Internet to establish a communication link with a camera associated with a home computer allowing the player to monitor their home.

In one embodiment, the bar top gaming unit 20 may include a headphone jack (not shown). A player may plug in headphone and obtain an audio feed via the jack. The audio feed may comprise the sounds generated by the gaming controller 76 and normally produced by the speakers 134. Alternatively, the audio may comprise other information, such as music or the like. In one embodiment, the player may be permitted to choose the audio information, such as with a channel selector associated with the jack. In an embodiment where two displays are provided, a player may watch a movie or television programming. The audio information may comprise the audio track/feed of the movie or television programming.

In one embodiment, only a single speaker or more than two speakers may be provided for generating sound. The speakers may also be located at other than the front panel. For example, a speaker may be associated with the top panel.

The gaming unit may be associated with one or more other devices. In one embodiment, the gaming unit is associated with a network including at least one communication link between the gaming unit and another device. The gaming controller 76 may include a communication interface associated with the bus. The communication interface or adapter maybe adapted to send and receive information in one or more of a variety of communication protocols. These protocols may include Bluetooth or other protocols for transmitting and receiving data over a wireless communication link, or USB, Ethernet, IEEE-1394 or other protocols for transmitting and receiving data over a wired communication link.

In one embodiment, the gaming unit maybe associated with a player tracking or reward system network, a gaming unit security/monitoring network, or a wide or local area progressive or other award system. Such networks/systems are well known. In one embodiment, to limit the amount of data, such as game code, which must be stored at the gaming controller, the gaming controller may be in communication with a master gaming server which generates game play information and transmits it to the gaming controller of the bar top gaming unit. The gaming controller of the bar top gaming unit may then manipulate, configure or otherwise use the data for implementation of the game at the unit, including by displaying game play information.

The housing 22 of the bar top gaming unit 20 may have shapes other than that described above. As noted, in a preferred embodiment, the first and second sides 26,28 and front and rear walls 30,32 form a generally rectangular housing perimeter. The housing 22 may have a generally square perimeter. The housing 22 may have other shapes, such as oval or elliptical. In one embodiment, one or more wall members extend upwardly from a base, the wall member(s) forming the perimeter. For example, a continuous wall may form an oval perimeter of the housing 22. In such event, the top panel 40 may be of a similar shape, or may still be rectangular. A front panel 38 may also still be provided, but the panel instead of being flat being curved to match the curvature of the front area of the wall of the housing 22.

The housing 22 and other components may be formed from a variety of materials. As indicated, it is preferred that the housing 22, front panel 38, top panel 40 and other structural members of the bar top gaming unit 20 be constructed of metal. Alternatively, these and other elements may be constructed from wood, plastic or other material.

In one embodiment, the flange 60 which is used to mount the unit 20 need not extend around the entire to perimeter of the housing 22. Alternatively, the flange 60 need not be contiguous, and may extend outwardly in only one or more areas of the housing 22. Preferably, the flange 60 extends outwardly from at least opposing portions of the housing 22, such from at least a portion of the first and second sides 26,28 of the housing 22.

As is well known, in the event the display 70 is an LCD, plasma, CRT or similar type of display device, the display 70 will include a protective display screen. The display 70 may be mounted to that this display screen is located in the display opening 72. In another embodiment, a window element may be located in the opening and the display 70 is positioned behind this window element. The window element may comprise a glass, plexiglass, plastic or other clear and durable protective member which is positioned over or in the display opening 72.

In one embodiment, instead of providing a removable button panel 77, the buttons 80 or other input devices may be mounted directly to the top panel 40. For example, small openings may be provided in the top panel 40 for directly accepting individual buttons 80.

While the currency accepting/validating mechanism 88 is described as preferably configured to accept currency, the mechanism 88 may be configured to accept other items. For example, the mechanism 88 may be adapted to accept printed tickets or other elements.

The bar top gaming unit 20 has numerous advantages. Because of the configuration of the bar top gaming unit 20, it is very compact, taking up a minimal amount of space associated with a mounting surface and the space below the mounting surface.

First, the bar top gaming unit has a minimal depth. In this manner, the bar top gaming unit takes up little space under the bar top or other mounting surface. This allows, for example, the bar top gaming unit to be mounted above a cooler/refrigerator which is located under the bar surface.

The minimal depth of the bar top gaming unit is achieved for several reasons. First, the display is preferably an LCD, plasma or similar flat screen display having a minimal depth/thickness. Second, the display is mounted to an underside of a sloping section or portion of the top panel. Because the top panel 40 slopes upwardly, the display 70 does as well, creating a larger interior area under the display without increasing the depth of the housing 22 from the flange 60 to the base 24. Third, the display 70 is mounted over the gaming controller 76. This makes efficient use of the space within the interior area of the housing 22. Lastly, additional peripheral devices, such as the printing device 84 and currency acceptor/validator 88 mechanism and cash box 90 are located to either side of the display 70 and gaming controller 76. In these locations, the depth of the housing 22 can be minimized to only the depth necessary to accommodate the peripherals, as no other components need to be accommodated above or below them.

The location of components also minimizes the width and depth of the bar top gaming unit 20. In particular, very efficient use is made of the interior space. The individual components are arranged to be closely positioned, but without interference and in a manner occupying the minimal volume.

As noted, one advantage of the sloping surface of the top panel 40 is to create additional depth of the unit. Notably, the increase in depth of the interior space of the unit is not as to a portion of the housing 22 which extends below the mounting surface, but is above the mounting surface. Again, this fact means that while sufficient interior space is created for components, the depth of the unit 20 below a mounting surface is minimized.

Another advantage to the sloping top panel 40 is that the display 70 also slopes. The mounting angle of the display 70 facilitates viewing by a player, since the display 70 is angled towards the player. This aids in eliminating glare and other aberrations which make viewing of displays difficult.

The sloping top panel 40 also discourages players and others from setting drinks and food on the bar top gaming unit. One problem with current units which are completely planar is that a player may set their drink directly on or over the display or other portions of the top of the unit. Condensation or drink spillage may damage the gaming unit. In accordance with the invention, a player is discouraged from setting their food or drink on the unit because the top panel does not form a suitable planar supporting surface.

Another advantage of the invention is the manner by which its various internal components may be accessed. One advantage of the arrangement of the components is that while occupying a minimum amount of space, the components are not layered upon one another limiting access to them. Instead, the components in the housing are located side-by-side, permitting unobstructed access thereto. Alternatively, the components are mounted to a moveable member permitting them to be moved into an accessible position. For example, the speakers 134 are mounted to the movable front panel 38. The display 70 is mounted to the top panel 40.

First, certain components may easily be accessed via the front panel 38. Once the front panel 38 is opened, the top panel 40 may also be opened. In the arrangement of the invention, the latch 41 for the top panel 40 is accessed via the front panel 38. Typically, the front panel 38 faces outwardly but it located below the mounting or bar surface, and thus not readily visible to a player. In this manner, a lock or latching member for the top panel 40 is not associated directly with the outside of the top panel, and thus not readily visible by a player. This reduced the desire of a player or other party to tamper with the lock and attempt to gain access to the unit.

Importantly, even once the top panel 40 is opened, such as for servicing of the gaming controller 76, display 70 or the like, the cash box 90 may not be removed. The cash box 90 remains locked in place via the lock 106 unless the party has the appropriate key for actuating the cash box lock 106.

Appropriate personnel may access the bill validator 88 and cash box 90 via the bill validator door 92. The door 92 may be opened separately from the top panel 40, eliminating the need to open the front panel 38 and release the top panel 40. This is advantageous, because it prevents a person whose job is only to service the currency acceptor/validator mechanism 88 or cash box 90 from accessing the other componentry of the bar top gaming unit 20. Once the bill validator door 92 is opened, the person still can not remove the cash box 90 without unlocking the cash box lock 106.

A variety of other design features and elements contribute to provide an advantageous gaming unit. For example, the exhaust fan 132 is positioned at the rear of the unit, and thus expels air in an area remote from, and away from, the player of the unit.

The locking mechanism for the cash box 90 has several advantages. First, the cash box 90 is independently locked, preventing its removal even if the top panel 40 is open. Further, as designed, the locking mechanism secures the cash box 90 even if the cam member 110 does not engage the latch 91 of the cash box 90. In some instances, when the cash box 90 is inserted it is not inserted a sufficient distance to be fully engaged and move the latch 91 into its latching position. In this position, the latch 91 may not be engaged by the cam member 110 when it is rotated into its locked position. Nonetheless, when rotated into its locked position, the flange 109 of the lock prevents the cash box 90 from being removed, as upward movement of the cash box 90 is inhibited.

Another advantage of the locking mechanism for the cash box 90 is that when the cam member 110 is rotated into its unlocked position, it does not obstruct the pathway for removal of the cash box 90. As best illustrated in FIG. 5(*b*), when the locking mechanism is unlocked, the cam member 110 is rotated upwardly away from the cash box 90. The cash box 90 may be pulled upwardly and removed from the gaming unit 20 without interference.

As noted, because of the location and configuration of the cash box locking mechanism, the locking mechanism occupies very little space. This contributes to the small size of the gaming unit 20.

It will be understood that the above described arrangements of apparatus and the method therefrom are merely illustrative of applications of the principles of this invention and many other embodiments and modifications may be made without departing from the spirit and scope of the invention as defined in the claims.

I claim:

1. A gaming unit configured to be mounted in a support surface comprising:

a housing have a base, a first side and opposing second side extending upwardly from said base, a rear wall extending between said first and second sides and a front wall extending between said first and second sides, said first and second sides and front and rear walls defining a rectangular periphery of said housing, said housing defining an interior area;

a top panel, said top panel rotatably connected to said housing, said top panel including at least one section sloping with respect to horizontal when said housing is mounted to a support surface and said base is horizontal;

a flange extending outwardly from at least a portion of said housing adapted to engage said support surface for mounting said gaming unit;

at least one display mounted to said at least one sloping section of said top panel at an inner surface thereof, whereby a viewing surface of said display is tilted upwardly with respect to the horizontal;

a gaming controller located in said interior area of said housing and adapted to generate game information for display by said at least one display;

a printing device located in said interior area of said housing, said top panel including at least one opening through which printed material may be dispensed from said print device;

a validation and storage device located in said interior area of said housing, said top panel including at least one opening through which currency may be inserted into said validation device;

said printing device located near said first side of said housing, said validation and storage device located near said second side of said housing, said gaming controller located between said printing device and validation and storage device and beneath said display.

2. The gaming unit in accordance with claim 1 including a strut having a first end connected to said top panel and a second end connected to said housing.

3. The gaming unit in accordance with claim 1 including at least one member limiting the extent of rotation of said top panel with respect to said housing.

4. The gaming unit in accordance with claim 1 including an opening in said front wall, and a front panel for selectively closing said opening in said front wall.

5. The gaming unit in accordance with claim 1 including an exhaust opening in said rear wall and at least one fan adapted to draw air from within said housing and expel it through said exhaust opening.

6. The gaming unit in accordance with claim 5 including at least one port in a front panel associated with said front wall through which air is drawn into said interior area.

7. The gaming unit in accordance with claim 4 including at least one speaker mounted to said front panel.

8. A gaming unit for location in an opening formed in a planar mounting surface comprising:

a housing including a base and at least one wall extending upwardly from said base, said base and at least one wall cooperating to define an interior area, said housing sized to fit through said opening, said housing including a top panel movably connected to said at least one wall, said top panel having a section which slopes upwardly with respect to a horizontal plane when said gaming unit is mounted to said planar mounting surface;

a display mounted to an underside of said sloping section of said top panel, said display aligned with at least one aperture in said sloping section of said top panel;

a gaming controller located in said interior area beneath said display; and a flange extending outwardly perpendicular to said at least one wall beyond said housing, said flange adapted to engage said planar mounting surface when said housing is extended there through for supporting said gaming unit, said flange in one or more locations positioned below said upwardly sloping section of said top panel.

9. The gaming unit in accordance with claim 8 wherein said wall defines a rectangular perimeter and said flange extends around the entirety of said perimeter.

10. The gaming unit in accordance with claim 8 wherein said top panel includes at least one planar section and one or more input devices are located at said at least one planar section.

11. The gaming unit in accordance with claim 8 wherein said top panel comprises a rigid body hingedly connected to said at least one wall and movable between a lowered play position and a raised, open non-use position in which the interior area is accessible.

12. The gaming unit in accordance with claim 8 including a latch adapted to secure said top panel in its lowered position, said latch disengageable to permit said top panel to be moved to its open position.

* * * * *

UNITED STATES PATENT AND TRADEMARK OFFICE

CERTIFICATE OF CORRECTION

PATENT NO. : 6,688,984 B2
DATED : February 10, 2004
INVENTOR(S) : Joseph W. Cole It is certified that error appears in the above-identified patent and that said Letters Patent is hereby corrected as shown below:

Column 2,
Line 31, please delete the word "remote" and insert -- remove --
Line 49, please delete the word "abase" and insert -- a base --

Column 3,
Line 41, please delete the word "gaming" and insert -- gaining --

Column 7,
Line 41, please delete "72is" and insert -- 72 is --
Line 50, please delete "maybe" and insert -- may be --

Column 10,
Line 57, please delete "1,2 and 4" and insert -- 1, 2 and 4 --

Column 11,
Line 46, please delete "electromechanical" and insert -- electro-mechanical --

Signed and Sealed this

Fifteenth Day of June, 2004

JON W. DUDAS
*Acting Director of the United States Patent and Trademark Office*